S. H. TINSMAN.
AGRICULTURAL MACHINE.
APPLICATION FILED APR. 14, 1916.
1,317,739.
Patented Oct. 7, 1919.
4 SHEETS—SHEET 3.
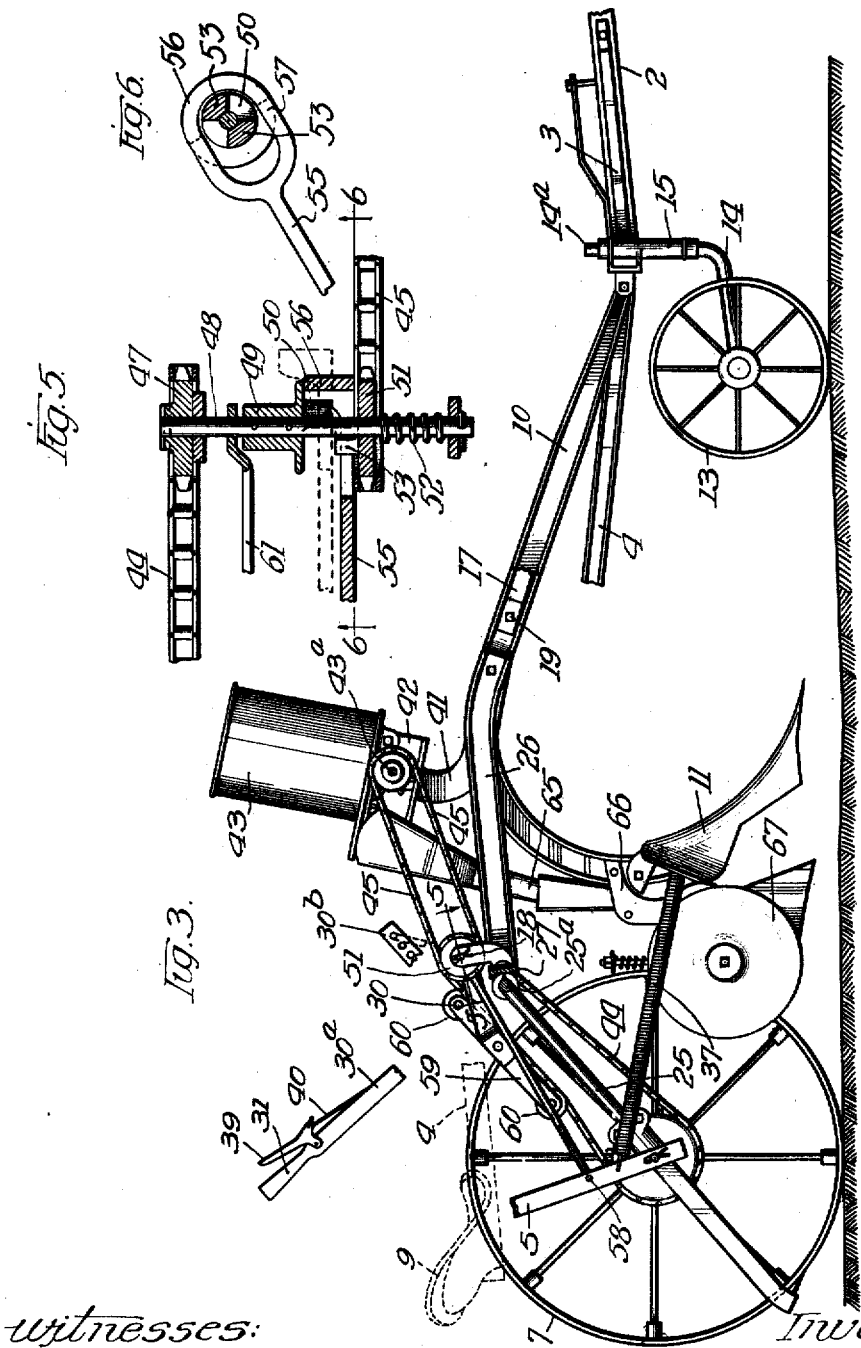

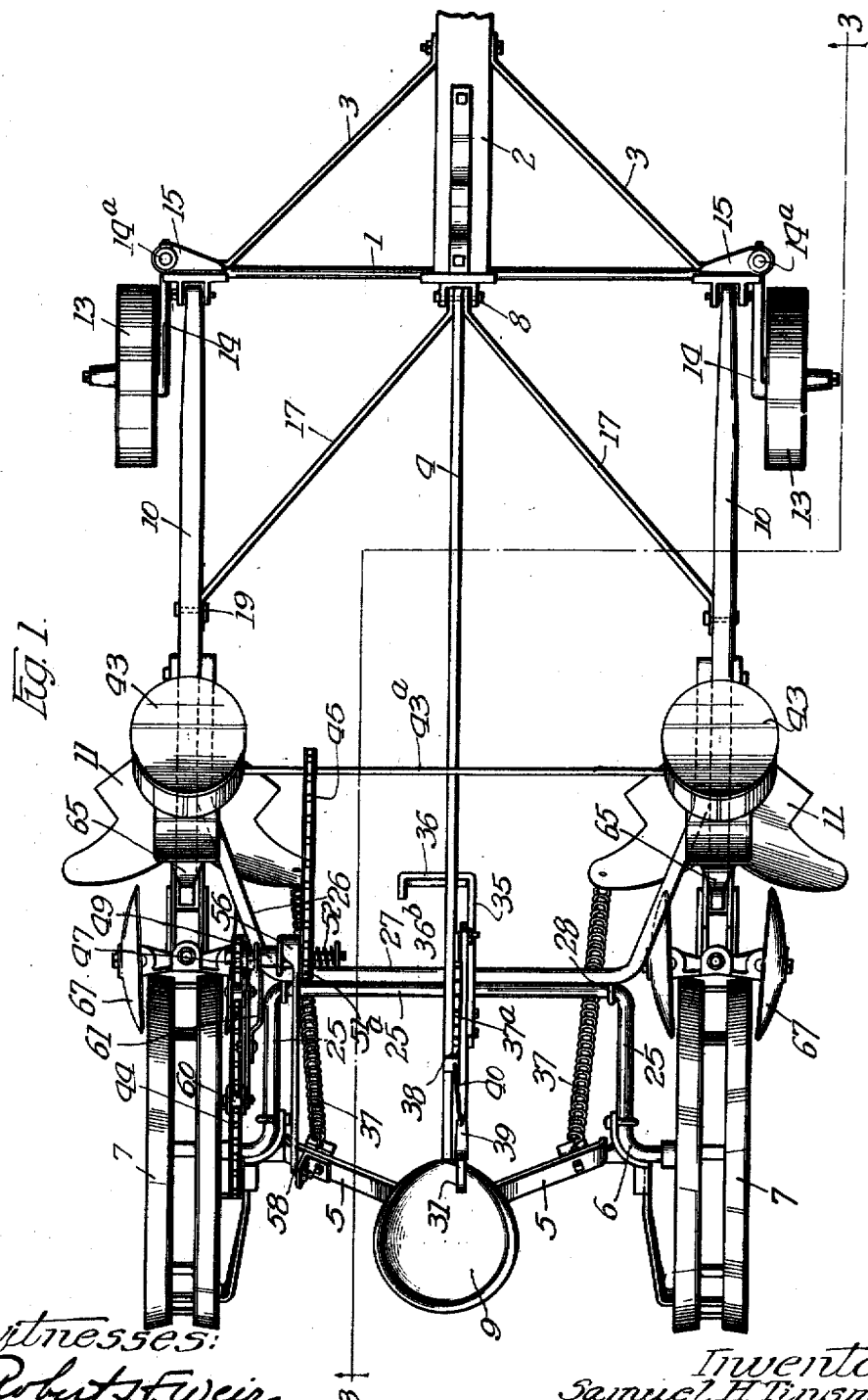

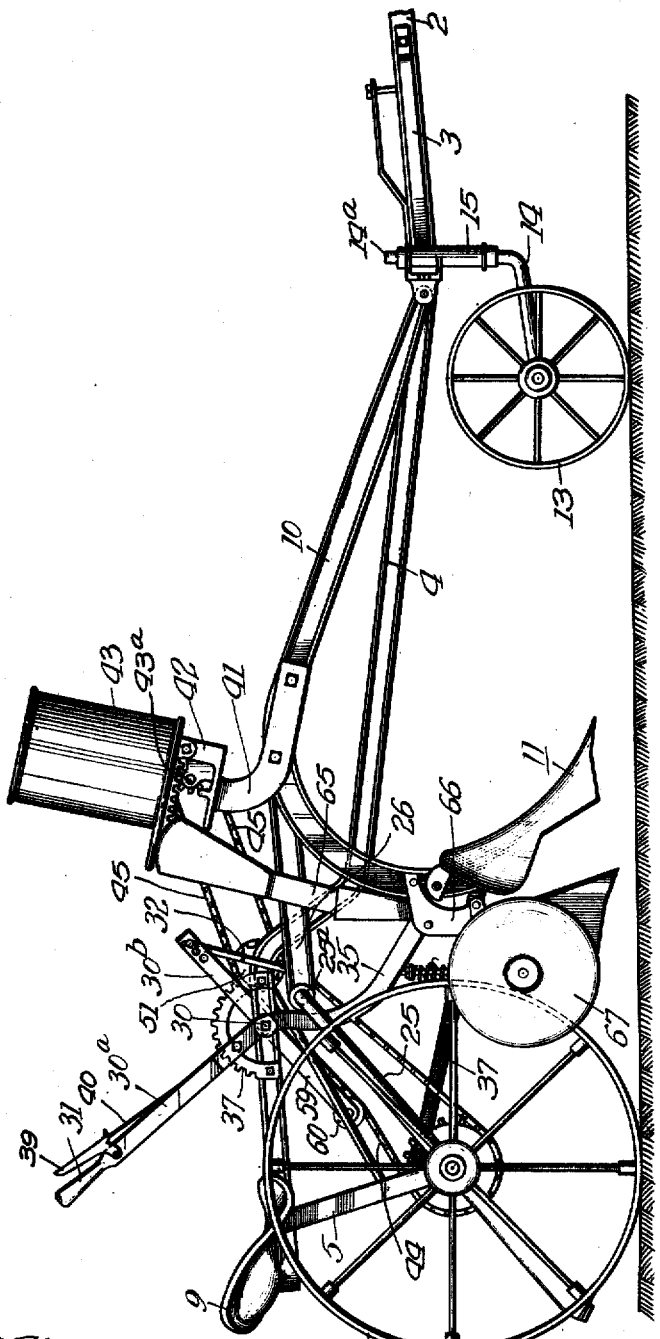

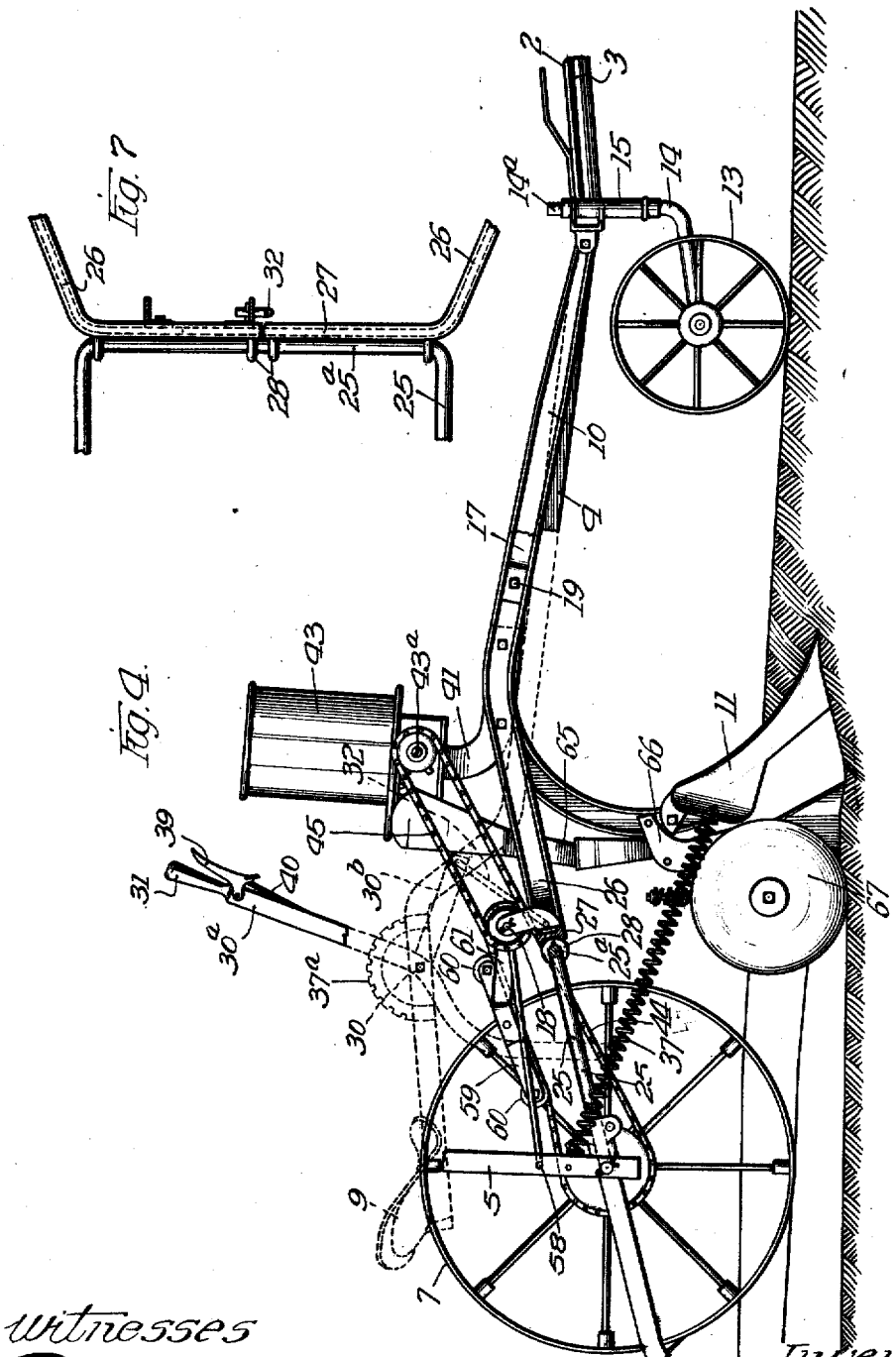

UNITED STATES PATENT OFFICE.

SAMUEL H. TINSMAN, OF MORRIS, ILLINOIS.

AGRICULTURAL MACHINE.

1,317,739. Specification of Letters Patent. Patented Oct. 7, 1919.

Application filed April 14, 1916. Serial No. 91,002.

*To all whom it may concern:*

Be it known that I, SAMUEL H. TINSMAN, a citizen of the United States of America, and resident of Morris, Grundy county, Illinois, have invented a certain new and useful Improvement in Agricultural Machines, of which the following is a specification.

My invention relates to improvements in agricultural machines and has more particular reference to improvements in planters and similar structures.

One of the objects of my invention is to provide an improved planter or like structure which will be relieved of and which will not be injured by the strains and stresses to which a machine of this character is subjected especially when operating over rough and irregular ground, my aim being to attain this result by the provision of a flexible or yielding frame construction capable of adapting itself to ground irregularities, and to avoid the rigid inflexible frame constructions commonly employed in machines of this character now on the market.

A further object is to provide an improved construction by which the plow shares can be raised and lowered at the will of the operator, and further that when so raised and lowered the plows will leave and enter the ground points lowermost.

Another object is to drive the planting mechanism or seed dropping mechanism from the wheels of the structure and to automatically connect said mechanism with and disconnect it from the driving power in the act of lowering and raising the machine.

A further object is to provide an improved structure of this character which will be simple, durable and reliable in construction and effective and efficient in operation.

Other objects of my invention will appear hereinafter.

My invention consists in the features of novelty exemplified in the construction, combination and arrangement of parts hereinafter described, shown in the accompanying drawings and more particularly set forth in the appended claims.

Referring to the accompanying drawings:

Figure 1 is a top plan view of a structure embodying my invention;

Fig. 2 is a view in side elevation thereof, the parts being shown in their raised or elevated position;

Fig. 3 is a view partly in section taken substantially on the line 3—3 of Fig. 1, the parts here also being shown in their elevated position;

Fig. 4 is a view similar to Fig. 3 taken on the line 3—3 of Fig. 1 but showing the parts in their lowered or operating position;

Fig. 5 is an enlarged detail of the clutch mechanism for connecting and disconnecting the planting mechanism being taken substantially on the line 5—5 of Fig. 3;

Fig. 6 is an enlarged detail of the clutch shifting or throwing device; and

Fig. 7 is a detail in plan view of a portion of the rear bail axle hinged or pivoted to the frame.

The structure illustrated in the drawings, and in which I have embodied my invention, is representative of various agricultural apparatus for which my invention is especially adaptable, but this particular structure is intended for a planter and cultivator by which two furrows are made, planted and covered. This structure has what might be termed a frame mounted upon wheels, but in a sense the machine may be said to be frameless because the usual frame bars and members are eliminated. I provide a transverse yoke or beam member 1 to which a tongue 2 is securely fastened at the central portion thereof. This tongue and yoke are rigidly maintained in their proper relation by diagonal braces 3 so as to provide a structure which will be rigid against lateral strains. Pivoted to this yoke, at its central portion, is an arch bar 4 which extends the entire length of the machine and is supported at its rear end by uprights or standards 5. The upper ends of these uprights are pivotally connected to the arch beam 4 and their lower ends are pivotally attached to castings 6 which are supported on the rear wheel axle as will be later explained. These uprights are downwardly divergent with respect to each other and hold the rear end of the arch beam against lateral movement, but at the same time, due to the pivotal connections, the rear wheels 7 are capable of bodily movement forwardly and rearwardly. The pivotal connection at the forward end of the arch beam is loose and permits of a considerable relative movement between the arch beam and the yoke, this movement being in a sense substantially universal within the limits. The joint may be of any suitable type for the purpose but the simplest form consists of a pair of spaced lugs 8 extending rearwardly from the yoke and carrying a transverse bolt. This bolt passes through a comparatively large opening in the end of the arch beam so as to provide a loose pivotal or universal joint. The rear end of the arch beam carries a suitable seat 9 for the operator in convenient position to watch and operate the mechanism. Intermediate its ends the arch beam is bent or turned upwardly for a portion of its length and then continued rearwardly so that the rear portion thereof will be elevated to the proper height relatively to the operating mechanism while the forward portion is low enough to clear the parts of the structure which raise and lower. Extending rearwardly from the front yoke is a pair of plow beams 10 which are arranged substantially parallel to each other but which incline upwardly and then curve downwardly at their rear ends so as to support the plow shares and mold boards 11 in proper position. These plow beams are pivotally connected directly to the yoke in a manner similar to that in which the arch beam is connected to the yoke; that is to say a loose connection is provided to permit of a substantially universal movement of the plow beam. The front end of the frame is supported by a pair of caster wheels 13 which are mounted upon axles 14. These axles, as clearly shown in the drawings, have laterally extending portions upon which the wheels are journaled and longitudinally extending portions which terminate in vertically disposed portions 14ª. These vertically disposed portions of the axle member are journaled in bearings 15 carried by the outer ends of the yoke member so that the wheels may have a free pivotal or caster movement with respect to the frame. The plow beams 10 are braced to prevent lateral skewing; that is to maintain the angle between the plow beams and the front yoke, the brace rods or bars 17 provided for this purpose extending diagonally rearwardly from the arch beam to which they are pivotally connected by the pivot bolt 8. At their rear ends these brace rods are pivotally connected by the bolts 19 to the plow beams in such manner that while they maintain the angular relation between the plow beams and the front yoke member 1, they will pivotally yield where the plow beams are raised or lowered individually in the operation of the structure over irregular ground. The rear wheels 7 are of the divided or double rim type adapted to follow in the path of the cultivator disks and the peripheries of which are inclined or diverged and operate to close the furrow after the seeds have been planted. These wheels, as before mentioned, are mounted upon an axle 25 which is in the form of a bail and which has its outer ends turned laterally and disposed in alinement to provide mountings for the wheels. The bail axle has a horizontal portion 25ª which is substantially parallel to the axes of the wheels but considerably offset with respect thereto. This horizontal portion of the bail is pivotally related to the plow beams in such manner that the axle and wheels may be swung relatively to the plow beams. For this purpose the plow beams have rearward extensions 26 rigidly secured thereto. These extensions have their rear end portions 27 turned horizontally and disposed in alinement in such manner that they meet or substantially abut in the longitudinal center of the entire structure. These portions 27 of the extensions thus lie parallel to the portion 25 of the bail axle and between the bail axle and portions 27 is the pivot or hinge upon which the bail and plow beams swing relatively to each other. This hinge is formed in the present structure by providing several loop members 28 on the portions 27 through which members the bail axles are passed and in which it is journaled, but these loop members are large enough to form a loose connection with the bail axle. The construction, which I have described, is arranged in such manner that by swinging the plow beams and bail axle relatively to each other about their hinge or pivotal connection, the structure may be buckled or partly folded to raise or elevate the plow member to a position above the ground, as clearly illustrated in Figs. 2 and 3. This relative movement of the parts may be accomplished by applying a lifting force at the hinge or pivotal connection of the axle and plow beams. And in this structure I have provided a lifting mechanism which comprises a bell crank lever and a link. The bell crank lever is pivoted at 30 to the central arch beam 4. One of its arms 30ª extends upwardly and terminates in a grip or handle member 31 by which the operator may while seated on the seat 9 manipulate said lever to raise and lower the frame. The arm 30ᵇ of said bell cranks extends forwardly and has a depending link 32 pivotally connected to its end. This link is also pivotally connected to a lug on one of the extension portions 27 substantially at the center of the frame so as to apply the lifting power substantially at the center of the frame. Since the arch or center beam 4 is supported in a substantially definite position it serves as a foundation or fixed member upon which to pivot the operating lever. The uprights 5, being pivoted to the beam 4 and to the rear bail axle, as previously described, are thus adaptable to the shortening of the wheel base of the machine due to the buckling or folding up of the structure when it is raised but at the same time these uprights maintain the central beam in substantially a definite position. The bell crank, one arm 30ª of which forms a manual operating lever, has a downwardly extending arm 35 which at its lower end is turned laterally to form a tread or foot piece 36 so that the operator may use both his arm and leg for actuating the mechanism. But to relieve the operator of the necessity of raising the entire weight of the structure, as above described, I provide a pair of lifting or counter-balancing springs 37 which are attached, as shown more clearly in Fig. 1 to the uprights 5 and to the ends of the mold boards respectively so that they will have a constant tendency to buckle or fold up the frame. Furthermore in lowering the frame they will absorb the shock and prevent the frame from dropping too suddenly into a lower or operating position. It is necessary of course that the structure be so arranged that it can be locked in its elevated or lowered position or in fact in any intermediate position desired, and as a simple form of lock for this purpose I provide a segment 37ª permanently fastened on the arch or center beam 4 and having locking teeth on its periphery. These teeth are engaged by a latch 38 which is carried by the operating lever 30ª. This latch is movable into and out of engagement with the teeth of the segment and is operated by a grip lever 39 through the medium of a link 40 which is connected between the grip lever 39 and the latch 38. The grip lever 39 is, as is customary in an apparatus of this character, pivotally mounted on the operating lever 30ª adjacent its upper or grip end 31 convenient for the operator. On each plow beam is mounted an upturned arm or member 41 which supports a seed dropping mechanism 42 which needs no particular description except to say that it has a seed box 43 and mechanism for counting and dropping periodically the proper number of seeds. This mechanism is intended as representative of any suitable or standard mechanism for the purpose. Both of the seed dropping mechanisms in this case are actuated by a common shaft 43ª (see Fig. 1) which extends transversely of the machine. This shaft is driven from one of the rear wheels 7 through the medium of a pair of sprocket chains 44 and 45 and suitable sprockets connected with the wheel 7 and the shaft 43 respectively. Intermediate of these two chains, however, is a clutch mechanism which is provided so that the seed dropping mechanism may be connected or disconnected with the driving wheel. In this structure (see Figs. 1, 5 and 6) the sprocket chain 44 drives a sprocket wheel 47 which is keyed on a shaft 48. The shaft 48 is mounted in suitable journal brackets fastened to the lateral extension portion 27 of one of the plow beams. This shaft also carries a clutch member 49 having a projecting tooth 50 on its face. The other clutch member is the sprocket wheel 51 which drives the chain 45 extending to the common shaft 43ª. This sprocket wheel is spring-pressed by the spring 52 toward the clutch member 49, and this sprocket carries a tooth 53 similar to the tooth 50 of the other clutch member with which it coöperates. When the teeth are in engagement the chain 45 and counter-shaft 43ª will, of course, be driven through the medium of the clutch, but when the sprocket 51 is shifted so that the teeth disengage the seed shaft will be disconnected from its driving power. In this structure I arrange the mechanism so that the clutch will be operated automatically in the act of raising and lowering the structure. The means for accomplishing this consists of a rod 55 (see Fig. 6) having a loop 57 at its end which embraces the shaft 48 and the teeth of the clutch member. At its end this loop portion is enlarged to form a cam 56 which when the rod is pulled is adapted to wedge between the clutch members and separate the teeth. And on the other hand when the rod is compressed or shifted in the opposite direction the wedge cam is removed from between the clutch members and allows the teeth to engage. Movement is imparted to this clutch shifting rod automatically by reason of its pivotal connection at 58 to one of the uprights or standards 5, as shown clearly in Fig. 3. Thus when the plows are elevated the resultant movement imparted to the clutch shifting rod is in the proper direction to position the cam between the clutch members and disconnecting the seed dropping mechanism and vice versa when the machine is lowered. This rod operates in the proper direction to permit the clutch members to engage and connect the seed dropping mechanism on account of the relative movement of the rear wheel and the sprocket 47 when the plows are raised and lowered I find it advisable to provide a chain tightener for taking up the slack in the sprocket chain 44. In this structure this tightener consists of a bar 59 having a small roller 60 at each end which rollers rest upon the chain. This bar 59 is supported by an arm 61 which is pivotally mounted on a shaft 48. The weight of this mechanism thus operates to take up the slack in the chain. From each seed dropping mechanism extends a flexible chute 65, the lower end of which is supported by a bracket 66 on the plow beam in position to direct the seed into the furrow just behind the plow shares. These brackets also support a pair of cultivator disks 67 positioned in the rear of the plows and adapted to throw the earth again into the furrow after the seed has been deposited therein. This, however, needs no particular description and is intended as representative of any suitable mechanism for the purpose.

What I claim as my invention is:

1. The combination of a frame, a plurality of plow beams pivotally mounted at their forward ends to said frame, plow shares suspended from said beams, and a bail axle having supporting wheels mounted thereon, said plow beams and bail axle being loosely articulated together to form a flexible structure supported by said wheels.

2. The combination of a bail axle, a pair of supporting wheels mounted thereon, a pair of plow beams pivotally attached to said bail axle, having wheels supporting the front end thereof, plow shares carried by said beams, an arch beam extending longitudinally of the structure and connected to the front end of said beams and supported at its rear end by said bail axle, and means mounted on the arch bar for moving said axle and beams about their pivot to raise and lower the plows.

3. The combination of a front yoke, ground wheels therefor, spaced side members flexibly connected to the yoke, a rear bail axle pivoted to the side members, wheels for the axle, a lifting mechanism supported by the front yoke and side portions of the bail axle and operatively connected to the side members.

4. The combination of a pair of plow beams, a yoke member to which said beams are flexibly connected, a bail axle independently hinged on both plow beams, a pair of wheels mounted on said bail axle, and wheels supporting said yoke member.

5. The combination of a pair of plow beams, a yoke member to which said beams are flexibly connected, a bail axle independently hinged on both plow beams, a pair of wheels mounted on said bail axle, a beam independently supported by said bail axle and pivotally connected to said yoke, and a manually operated lifting device supported by said beam and arranged to raise and lower the plow beams.

6. The combination of a pair of plow beams, a yoke member to which said beams are flexibly connected, a bail axle independently hinged on both plow beams, a pair of wheels mounted on said bail axle, a beam independently supported by said bail axle and pivotally connected to said yoke, a manually operated lifting device supported by said beam and connected to said bail for raising and lowering the plow beams, and assisting spring mechanism acting on said plow beams and tending to raise same.

7. The combination of a front yoke member, a tongue rigidly attached thereto, a pair of plow beams pivotally attached to the ends of said yoke, extensions on said beams turned toward each other and disposed in alinement, a bail axle loosely hinged on the turned extensions, wheels on said bail axle, a beam extending from said yoke to the rear end of the frame, uprights supported by said wheels and pivotally connected to said beam, a lifting lever pivoted on said beam and connected to said plow beams for raising said beams, and a lock for holding said plow beams in their raised position.

8. The combination of a bail axle and wheels thereon, a pair of plow beams pivotally connected independently to said bail axle at their rear ends and having plow shares depending therefrom, a draft yoke pivotally connected to the forward ends of said beams to form an articulated flexible structure, and wheels mounted on said yoke and supporting the forward ends of said beams.

9. The combination of a bail axle and wheels thereon, a pair of plow beams pivotally connected independently to said bail axle at their rear ends and having plow shares depending therefrom, a draft yoke pivotally connected to the forward ends of said beams to form an articulated flexible structure, wheels mounted on said yoke and supporting the forward ends of said beams, an independent beam extending rearwardly from said yoke and pivotally connected therewith, members independently supported by said rear wheels and pivotally connected to the rear end of said independent beam, and manual lever mechanism mounted on said independent beam and connected to said plow beams for raising and lowering said plow beams.

10. The combination of a pair of plow beams, a draft yoke flexibly connected to the forward ends of said beams and having wheel supports, a bail axle flexibly hinged to the rear ends of said beams and having wheels mounted thereon, whereby a relative rotation of the plow beams and bail axle about their hinge connection operate to raise and lower the plow beams with respect to the ground, plow shares supported by the lower ends of said plow beams, risers pivotally supported by the rear wheels, an independent beam pivotally connected to said risers extending to and pivotally connected with said draft yoke, an operator's seat supported by said risers and independent beam, and an operating lever carried by said independent beam and connected to said plow beams for raising and lowering the plow beams.

Signed by me at Chicago, Illinois, this 13th day of January, 1916.

SAMUEL H. TINSMAN.

Witnesses:
E. H. CLEGG,
AMY JEHLE.